UNITED STATES PATENT OFFICE.

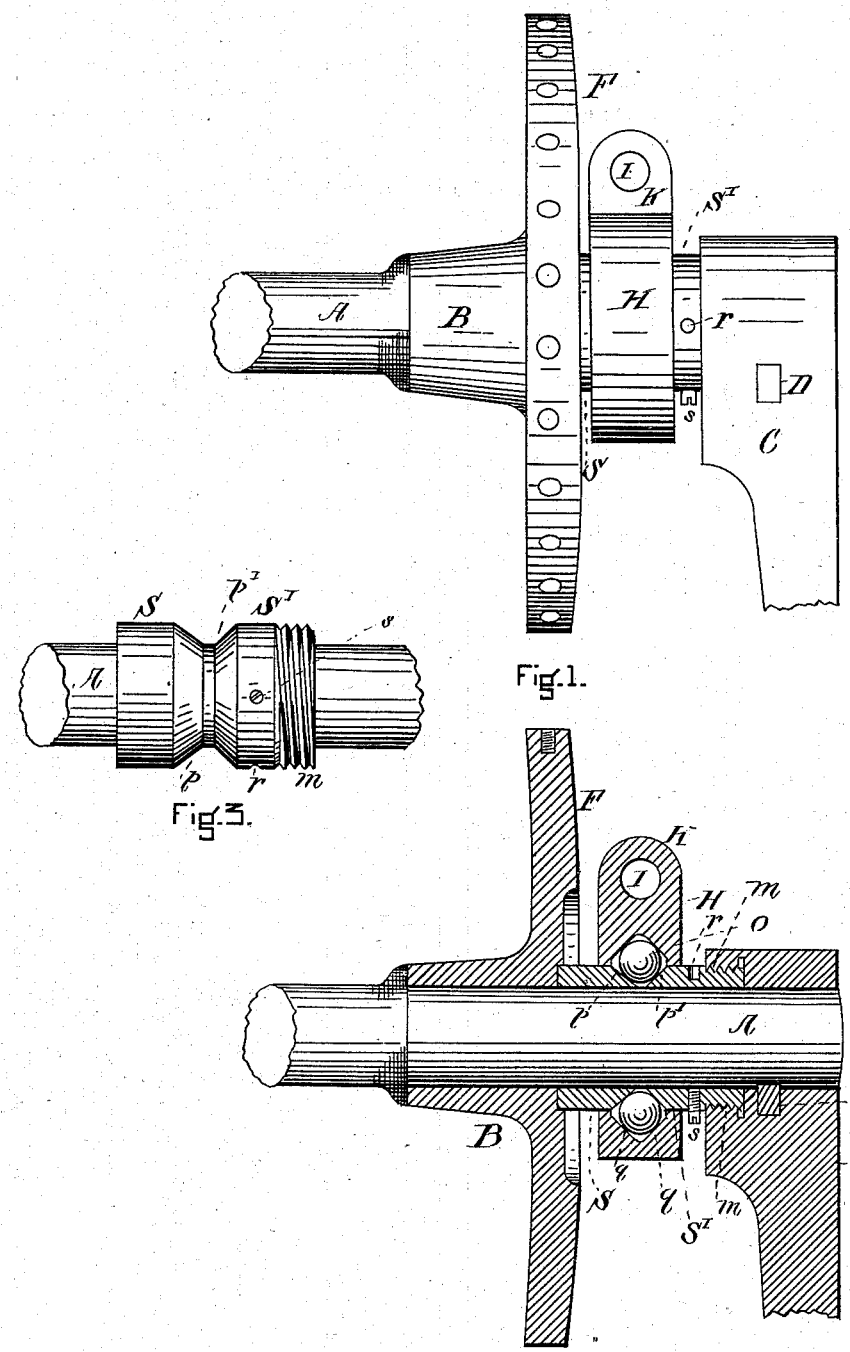

ALBERT E. WALLACE, OF HARTFORD, CONNECTICUT, ASSIGNOR TO THE POPE MANUFACTURING COMPANY, OF BOSTON, MASSACHUSETTS.

AXLE-BEARING FOR VEHICLE-WHEELS.

SPECIFICATION forming part of Letters Patent No. 249,278, dated November 8, 1881.

Application filed March 8, 1881. (No model.)

*To all whom it may concern:*

Be it known that I, ALBERT E. WALLACE, of Hartford, in the county of Hartford and State of Connecticut, have invented certain new and useful Improvements in Anti-Friction Bearings for Bicycle and other Wheels, of which the following is a specification, and which are shown in one form in a contrivance represented in the accompanying drawings, in which—

Figure 1 represents in elevation, and Fig. 2 in vertical section, an axle, a hub, and segment of crank, with other parts embodying my improvements. Fig. 3 represents in elevation the axle in segment, on which are part of my improvements, and in which the same letters represent the same parts.

A is an axle. B is a hub fixed thereon, having the flange or enlarged portion F for receiving and supporting the ends of the spokes.

C is a crank fitting onto the end of the axle A, which may be fastened thereon by means of a key, D, firmly, so that the two shall turn together. The crank C has a boss on the side toward the wheel, in which is cut a threaded recess.

H is a bearing-box, constructed of one piece of metal, the body of which is cylindrical in its external form, and bears a lug, K, containing a slot, I, by means of which it may be attached to the front fork of a bicycle in any desirable manner. This box H contains a cylindrical opening through it, and is recessed internally, as shown in Fig. 2, so as to have the inclined surfaces $q\ q$.

S is a sleeve or collar fitting on the axle A and entering a recess, $w$, in the hub at one end and having the inclined surface $p$ at the other end, and of such diameter that its peripheral surface fits freely the cylindrical opening in the side of the box H. S' is another sleeve or collar, which also fits the axle A, and which may be moved thereon to and from the collar S. It has at one end the inclined surface $p'$ and at the other end the threaded part $m$, which corresponds with the threaded recess in the crank-boss.

$s$ is a set-screw, threaded and working in the side of the collar S'.

$r$ is a small slot or vertical hole in the collar S'.

O O are small hardened steel balls, of which there are a sufficient number to substantially fill in a row the annular recess in the box H, so that they may freely turn on the inclined surfaces $q\ q$. These surfaces $q\ q$ may be case-hardened steel, as I prefer to make them, and the collars S S' as well as the box H also being of steel, as I prefer to make them, and having the inclined surfaces $p\ p'$ case-hardened. I make the surface $p$ inclined at an angle a little less than forty-five degrees to the axle, and the surface $p'$ at an angle a little greater than forty-five degrees to the surface of the axle, for the reason that in setting up for wear, as will be described, the adjustment is easier and better when constructed this way.

The parts being constructed substantially as I have described, in the contrivance adapted for a bicycle, in which the hub B is fixed to the axle A and revolves with it, I place the collar S on the axle close up to and into the recess $w$ of the hub B. I place the row of balls O O in box H, and put the whole on the axle, so that the collar S projects into the side of the box H, and the bearing-surface $p$ is in contact with the balls. I then screw the threaded end $m$ of the collar S into the crank C as far as it is made to go, substantially, and then place both the crank and the collar S on the axle, as shown in Figs. 1 and 2, so that the collar S projects into the cylindrical opening in the side of the box H, and so that the slot in the crank for the key D corresponding with the slot or groove in the axle corresponding with it, and insert the key D and fasten the crank and axle together rigidly. I then insert the end of a small steel rod in slot $r$, and by this means cause the collar S' to turn on the axle until by the operation of the thread at $m$ it is forced into the box H until the balls are brought to a suitable bearing upon the inclines $q\ q, p$, and $p'$, and then I insert the set-screw $s$, and screw it in tight to the axle A, box H being then held, as, for instance, by the lug K, in the front fork of the bicycle, and, the crank C being turned, the axle, the hub, and the collars S S', are revolved, the collars turning in the bearing-box and upon the balls O O.

I have here described the application of my improvements to the axle on which the wheel is fixe and revolves with it—such as a bicycle-wheel; but it is obvious that it may be applied to wheels which revolve on the axle with a slight modification of the parts, in which case the box H would be in the hub, and fixed thereto, instead of outside of and separate from it; but such modification would be obvious to any mechanic.

It is obvious that this bearing will be readily adjustable to compensate for any wear of the bearing parts by simply loosening the set-screw s and turning the collar S', so that the thread shall force it farther into the bearing-box, the impinging of the surface p' upon the balls tending to send them to and a properly close bearing upon the surfaces q q and p p', as in putting the parts together.

The advantages of balls or other revolving surfaces for collars to bear on, and by which the friction is reduced, are well known. I desire to point out, also, that this construction of collars, one of which is adjustable, may be applied to a bearing without balls; or, where rollers are used, or a plain annular surface is presented by the box H, or a ring contained in it, to the inclined surfaces p p'.

Heretofore many anti-friction bearings have been made and described, including various forms of ball-bearings, and the latter class have been constructed so as to be adjustable for wear by having the bearing-box made in two or more parts, and so that they may be made to approach each other to tighten the bearings. In respect to bearings for light wheels, particularly for bicycles, it is desirable to make the parts as light and snug and of as little material as possible, consistently with strength. To make them true—that is, so that the balls shall be perfect spheres—and of even diameter, and that the bearing-surfaces in which they revolve shall be of even distance apart, and of even curvature and shape, and shall be kept so, and that in putting together and adjusting the bearing parts shall be made to approach each other with perfect evenness. It is also desirable to make the parts and their joints as few as possible, so that the structure composed of them when put together and in operation shall not be liable to displacement, breakage, or accident.

It is the object of my improvement to secure these desirable qualities in an adjustable anti-friction ball-bearing, and to obviate the difficulties and imperfections existing in previous attempts in this direction.

I claim as new and of my invention—

1. A crank, C, constructed with a boss having a threaded recess adapted to receive the threaded end m of an adjustable collar on the axle, substantially as shown and described.

2. The described anti-friction bearing for a wheel and axle, consisting of a one-part bearing-box and a two-part sleeve, having a circular row of balls within said box and between bearing-surfaces in the box and on either part of the sleeve, and adapted for adjustment for wear and securement in position on an axle by a screw-thread at the outer end of one part of the sleeve, operating to draw it toward and from the other part, substantially as set forth.

3. The described anti-friction bearing for a wheel and axle, consisting of a two-part collar or sleeve adapted to inclose the axle, a one-part bearing-box inclosing said sleeve and containing a recess with bearing-surfaces between which and a bearing-surface on either part the said sleeve is held, a circular row of balls combined and constructed essentially as shown and described, for securement in position and adjustment for wear by the pressure of one part of the sleeve against the hub of the wheel, and by an external thread on the other part of the sleeve operating in an internal thread in a boss secured to the axle on the opposite side, substantially as set forth.

4. A combination, with the axle, hub, and crank-pin of a velocipede-wheel, a one-part box, a circular row of balls, and a two-part sleeve or collar, one part of said sleeve being loose on the axle and bearing against the hub, the other part having an external thread at one end, and being adjustable toward the other part by revolving on the axle, and having a set-screw to secure it in position, substantially as shown and described.

ALBERT E. WALLACE.

Witnesses:
GEO. H. DAY,
EUGENE J. POST.